United States Patent
Lester et al.

(10) Patent No.: US 6,905,162 B2
(45) Date of Patent: Jun. 14, 2005

(54) TRUCK CARGO BOX ENCLOSURE

(75) Inventors: Paul Lester, Commerce Township, MI (US); E. Mackey King, Howell, MI (US); Gerald Olszewski, Temperance, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/673,817

(22) Filed: Sep. 29, 2003

(65) Prior Publication Data

US 2005/0067854 A1 Mar. 31, 2005

(51) Int. Cl.[7] .................................................. B60P 7/04
(52) U.S. Cl. ........................ 296/100.18; 296/100.16; 296/100.17
(58) Field of Search ............................. 296/160, 167, 296/100.15–100.18, 136.12, 157, 159, 104, 296/164, 100.01; 135/88.01

(56) References Cited

U.S. PATENT DOCUMENTS

| 4,657,299 A | 4/1987 | Mahan |
| 4,938,523 A | 7/1990 | Camp |
| 5,058,652 A * | 10/1991 | Wheatley et al. ............ 160/327 |
| 5,339,851 A | 8/1994 | Miller et al. |
| D382,247 S | 8/1997 | Lindberg |
| 5,954,076 A | 9/1999 | McGinnis |
| 5,988,731 A * | 11/1999 | Eischen ...................... 296/159 |
| 6,481,784 B2 | 11/2002 | Cargill |
| 6,505,879 B1 * | 1/2003 | Arviso .................. 296/100.18 |
| 2002/0096902 A1 * | 7/2002 | Oswald et al. ............. 296/39.2 |

* cited by examiner

*Primary Examiner*—D. Glenn Dayoan
*Assistant Examiner*—Greg Blankenship
(74) *Attorney, Agent, or Firm*—Ralph E. Smith

(57) ABSTRACT

A tent enclosure for a pickup truck cargo box includes a pair of support tracks mounted to the side rails of the cargo box, a number of flexible support rods connected to the support tracks, and a fabric siding spanning the support rods and connected to the support tracks. The flexible support rods can be made up of multiple sections linked together, and, being longer than the width of the cargo box, describe an arch when connected to the support tracks. The forwardmost support rod can be secured to the truck cab. The fabric siding includes a U-channel edge for engaging the support track on each side of the cargo box, and is stretched over the support rods. The tent enclosure includes a door assembly for the end of the cargo box, which may be formed of fabric and integral with the fabric siding.

15 Claims, 2 Drawing Sheets

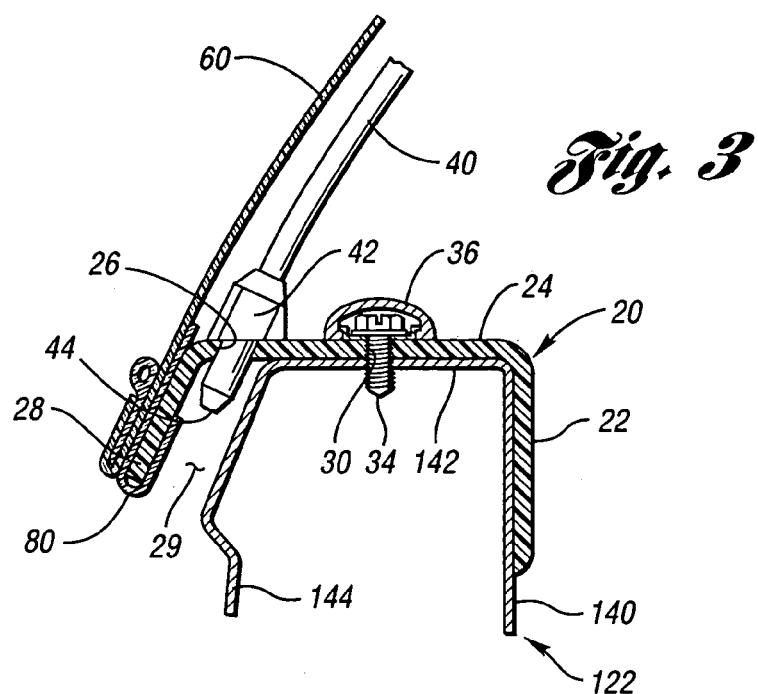
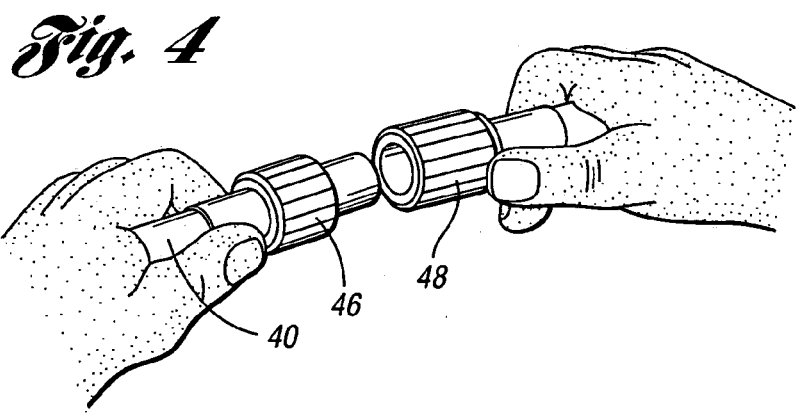
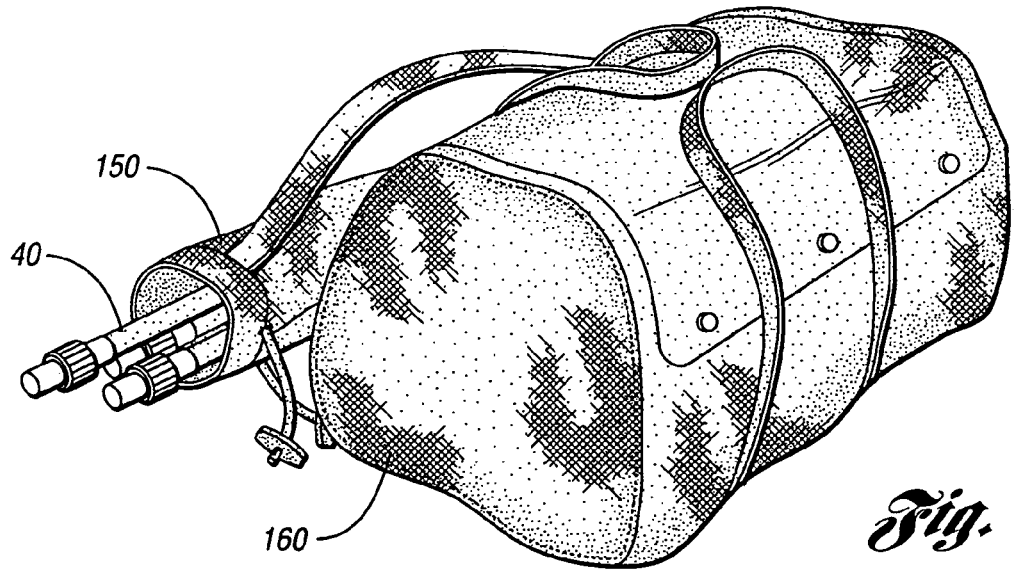

TRUCK CARGO BOX ENCLOSURE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to enclosures for pickup truck cargo boxes.

2. Description of Related Art

Pickup trucks offer their owners great utility. They have the capability of transporting at least two, and up to six people, and include an open cargo box capable of holding large items. This open cargo box, however, exposes any items carried to the vagaries of weather.

Attempts to overcome this disadvantage generally involve enclosing the cargo box with a rigid "camper shell" or a tonneau cover. While protecting the contents of the cargo box, these solutions also limit the capacity of the cargo box. If the owner wants to carry a larger item, the shell or cover must generally be removed. Such rigid assemblies are not easily removable, and consume a great deal of storage space. Also, should an owner wish to reinstall the cover, they must return to the place of storage.

Another utility of the pickup truck is for recreational activities such as going to the beach or camping. The cargo box can be used to carry any equipment the owner would want to have available at these locations. It is also known that the cargo box can be used as a place to sleep while on these outings. If the "camper shell" has been left home, however, the owner is left exposed to the elements.

It would be advantageous to provide an enclosure that can shield the contents of the cargo box from the elements, yet is easily removable and compact for storage in the pickup truck, such as behind the seat in the cab of the truck. Such an enclosure would provide the owner of the truck the flexibility of having the open cargo box, and the ability to quickly cover the cargo box, no matter the location.

BRIEF SUMMARY OF THE INVENTION

A truck cargo box enclosure includes a pair of support tracks adapted to mount to side rails of the cargo box, a plurality of flexible support rods for connecting to the support tracks, and a fabric siding adapted to span the support rods in tension and connect to the support tracks. In one embodiment of the invention, the flexible support rods are formed of multiple sections linked together and are longer than a width of the cargo box so as to describe an arch when connected to the support tracks. In a further embodiment of the invention, a forwardmost of the flexible support rods is adapted to be secured to a cab of the truck. In a further embodiment of the invention, the fabric siding includes a U-channel edge for engaging the support track on each side of the cargo box. In a further embodiment of the invention, the enclosure includes a door assembly for an end of the cargo box, and the door assembly may be formed of fabric and integral with the fabric siding.

BRIEF DESCRIPTION OF THE SEVERAL VIEWS OF THE DRAWINGS

The present invention will become more fully understood from the detailed description and the accompanying drawings, wherein:

FIG. 3 is a partial cross-sectional view taken through line 3—3 of FIG. 1.

FIG. 4 is a perspective view of a two-piece support rod of the truck cargo box enclosure of FIGS. 1–3.

FIG. 5 is a perspective view of storage totes for the enclosure of FIGS. 1–4.

DETAILED DESCRIPTION OF THE INVENTION

Figure 1:
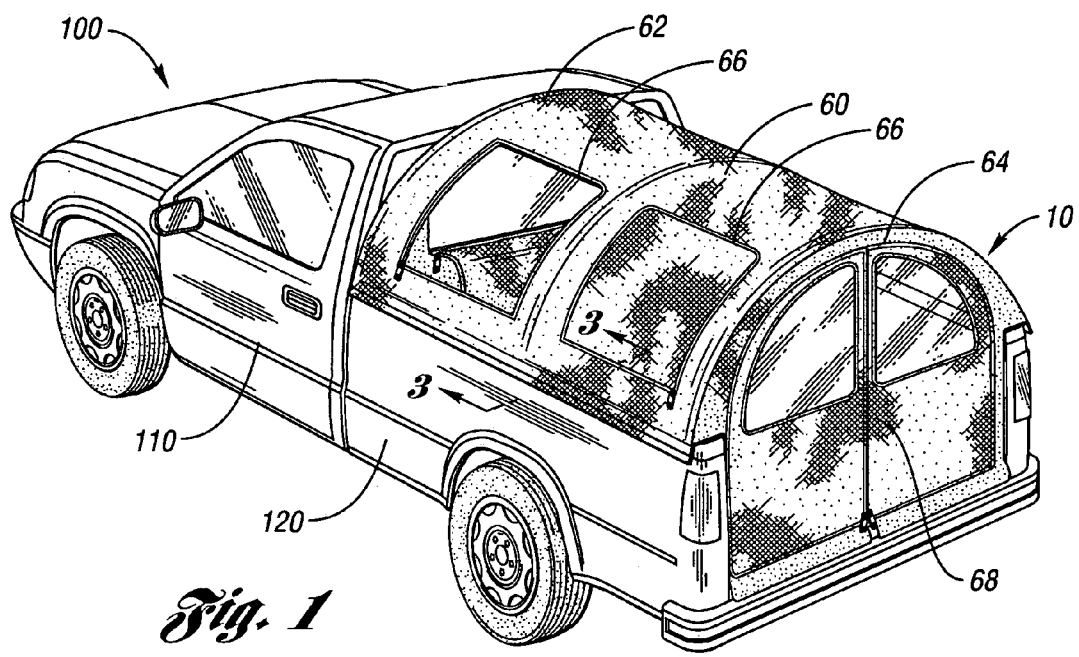
FIG. 1 is a perspective view of a pickup truck carrying a truck cargo box enclosure according to the invention.
Figure 2:
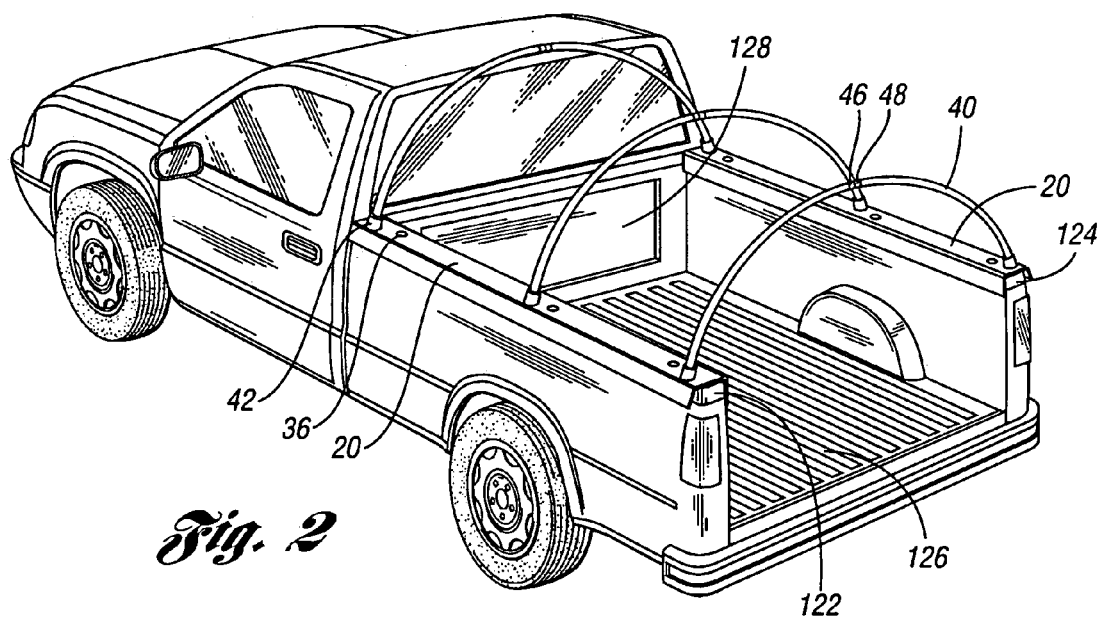
FIG. 2 is a perspective view of the frame of the truck cargo box enclosure of FIG. 1.

Referring to FIG. 1, a pickup truck 100 is shown with a truck cargo box enclosure 10 according to the invention. The pickup truck 100 generally has a truck cab 110 and a cargo box 120. Referring to FIG. 2, the cargo box 120 is defined by first side rail 122, second side rail 124, cargo floor 126, front bulkhead 128, and a tailgate (well known, and not shown for clarity). The tailgate can enclose the rear of the cargo box 120, or can fold downward to a horizontal position to the rear of the cargo box 120, as is well known. The enclosure 10 can function within cargo box 120 with the tailgate in both the open and closed positions.

With further reference to FIGS. 1–3, the enclosure 10 comprises a fabric covering 60 draped and stretched over a framework of flexible rods 40 supported by a pair of side support tracks 20. The fabric covering 60 can include one or a number of vent openings 66 that can include a screen for keeping insects out of the interior of the enclosure 10. The fabric covering 60 further includes a forward panel 62 and a rear panel 64, which can be formed integrally with covering 60, or can be attached by known methods such as zippers or hook-and-loop fasteners. The forward panel 62 includes a window opening for accessing the cab 110 of the truck 100. The rear panel 64 is shown with doors 68 for access to the interior of the enclosure 10.

Referring to FIGS. 2–4, the fabric covering 60 is supported on a framework of flexible rods 40 and linked together with side support tracks 20 mounted to each of the first and second side rails 122, 124 of the cargo box 120. FIG. 3 shows a side support track 20 mounted on first side rail 122; the mounting of a side support track 20 on second side rail 124 is the same.

Side support track 20 includes a vertical section 22 abutting the inner face 140 of side rail 122, a horizontal section 24 covering the upper face 142 of side rail 122 and a depending flange 28. Horizontal section 24 extends beyond the outer face 144 of side rail 122 so that depending flange 28 extends from the exterior edge of the horizontal section 24, leaving a gap 29 between flange 28 and outer face 144. Each side support track 20 further includes a number of rod receiving apertures 26. The apertures 26 of the opposing support track 20, attached to side rail 124, are in alignment for receipt of rods 40. In the disclosed embodiment, these apertures 26 are aligned with the gap 29. The side support track 20 is mounted to the cargo box side rail 122, such as by a fastener 34 passing through opening 30 and into side rail upper surface 142. Fastener 34 is covered by a protective cap 36.

Rods 40 are formed of multiple pieces for ease of storage, and are assembled for use by connecting fittings 46, 48 as shown in FIG. 4. Each end of the assembled rod 40 is terminated by an alignment pin 44 projecting from a support collar 42. Referring specifically to FIG. 3, the alignment pin 44 is inserted into aperture 26 in support track 20 so that support collar 42 abuts the upper surface of support track horizontal section 24. Alignment pin 44 passes through aperture 26 into gap 29. The opposing alignment pin 44 of the flexible rod 40 is inserted into the appropriate aperture 26 of the opposing support track 20 so that the rod 40 is supported at each end. Because the rod 40 is flexible and longer than the width of the cargo box 120, the rod 40 describes an arch over the cargo box 120. Multiple rods 40 form the framework seen in FIG. 2. Forwardmost rod 40 is secured to truck cab 110.

The fabric covering 60 is placed over the framework of rods 40. Each lateral edge of the fabric 60 is terminated by a channel 80, such as a U- or J-channel. Channel 80 is configured to receive depending flange 28, and to withstand the tension of fabric 60 being stretched over the framework of rods 40. Opposing channel 80 of the fabric 60 receives depending flange 24 of opposing support rail 20.

With forwardmost rod 40 secured to truck cab 110, enclosure 10 is compact and secure to remain in place when truck 100 is being operated. With fabric covering 60 in place and front and rear panels 62, 64 secured thereto, the cargo box 120 of truck 100 is protected from the elements. The enclosure 10 is easily disassembled by one person to open the cargo box 120, and is readily stored in truck 100, such as in storage totes 150, 160 shown in FIG. 5, so it is always available for enclosing the cargo box 120 when the need arises.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A truck cargo box enclosure including a pair of support tracks adapted to mount to side rails of the cargo box, a plurality of flexible support rods for connecting to the support tracks, and a fabric siding including a U-shaped channel edge for engaging the support track on each side of the cargo box and adapted to connect to the support tracks and span the support rods in tension.

2. The truck cargo box enclosure of claim 1, wherein the flexible support rods are formed of multiple sections linked together.

3. The truck cargo box enclosure of claim 2, wherein the flexible support rods are longer than a width of the cargo box so as to describe an arch when connected to the support tracks.

4. The truck cargo box enclosure of claim 1, further including a door assembly for an end of the cargo box.

5. The truck cargo box enclosure of claim 4, wherein the door assembly is formed of fabric and integral with the fabric siding.

6. A cover adapted to enclose an open vehicle portion defined by a plurality of opposing wall sections, comprising:
a plurality of cover support tracks each adapted to attach to one of the plurality of opposing wall sections, each cover support track extending beyond an outer face of the wall section, and comprising a plurality of apertures and a depending flange;
a plurality of flexible support rods having an alignment tip and collar on each end; and
a fabric covering having a lateral edge comprising a channel section adapted to engage the depending flange of one of the pair of cover support tracks,
wherein the tips of the support rods are adapted to engage the apertures of support tracks on opposing wall sections, supported on the collars, to define a support framework, and the fabric covering is adapted to span at least a portion of the support framework in tension with the channel section engaging the depending flange.

7. The cover of claim 6, wherein the fabric covering comprises a second lateral edge comprising a second channel section, and wherein the channel sections are adapted to engage the depending flange of cover support tracks attached to opposing wall sections to draw the tent fabric in tension over the support rods.

8. The cover of claim 7, wherein the support rods are each formed of at least two sections removably connected.

9. A vehicle cargo box having a pair of parallel side rails and a cargo box cover comprising:
a cover support track affixed to each of the parallel side rails, each cover support track extending beyond an outer face of the side rail and having a depending lip;
a plurality of support rods engaging the cover support tracks to form a frame over the cargo box; and
a fabric cover spanning the frame and having lateral edges each comprising an inwardly directed U-shaped channel engaging the depending lip.

10. The vehicle cargo box of claim 9, wherein the cover support track further comprises a plurality of apertures and wherein the support rods are adapted to engage the apertures.

11. The vehicle cargo box of claim 10, wherein at least one of the plurality of support rods comprises a tip and a collar adapted to engage the support rod with an aperture.

12. The vehicle cargo box of claim 9, wherein the support rods are flexible and the frame describes an arch over the cargo box.

13. The vehicle cargo box of claim 12, wherein the fabric spans the frame in tension.

14. The vehicle cargo box of claim 9, wherein the fabric spans the frame in tension.

15. The vehicle cargo box of claim 9, wherein the support rods are formed of a plurality of connected sections.

* * * * *

UNITED STATES PATENT AND TRADEMARK OFFICE
CERTIFICATE OF CORRECTION

PATENT NO. : 6,905,162 B2
DATED : June 14, 2005
INVENTOR(S) : Paul Lester, E. Mackey King and Gerald Olszewski It is certified that error appears in the above-identified patent and that said Letters Patent is hereby corrected as shown below:

<u>Title page,</u>
Item [75], Inventors, "Gerald Olszewski, Temperance, MI (US)" should be
-- Gerard Olszewski, Temperance, MI (US) --.

Signed and Sealed this

Ninth Day of May, 2006

JON W. DUDAS
*Director of the United States Patent and Trademark Office*